2,961,444
DECABORANE ADDUCTS WITH PYRIDINES AND THEIR PREPARATION

Victor Daniel Aftandilian, Wilmington, Del., assignor to E. I. du Pont de Nemours and Company, Wilmington, Del., a corporation of Delaware No Drawing. Filed Aug. 14, 1958, Ser. No. 754,942

10 Claims. (Cl. 260—290)

This invention relates to a new class of boron compounds and more particularly to certain decaborane adducts with pyridines.

Boron compounds, and particularly boron hydrides, have received a great deal of attention during the past few years as components of high energy fuels. As a result of this activity boron hydrides are becoming more available, and new outlets for them are being sought.

It has now been found that new and useful boron compounds can be prepared by reacting decaborane with pyridine or an alkyl-substituted pyridine. These compounds have the composition $B_{10}H_{12} \cdot 2Py$, where Py represents a member of the group consisting of pyridine and alkyl-substituted pyridines.

The novel compounds of this invention are conveniently prepared by adding the pyridine or alkyl-substituted pyridine to a solution of decaborane in a suitable solvent, e.g., an ether or a hydrocarbon. The reaction is illustrated by the following equation:

$$B_{10}H_{14} + 2C_5H_5N \rightarrow B_{10}H_{12} \cdot 2C_5H_5N + H_2$$

The course of the reaction can be followed by the evolution of hydrogen, one mole of hydrogen being liberated for each mole of decaborane. The reaction can generally be carried out at room temperature or even below, but moderate heating (25–100° C.) is advantageous, particularly with the alkyl-substituted pyridines. Inasmuch as the reaction involves one mole of decaborane and two moles of pyridine or alkyl-substituted pyridine, it is most economical to use the reactants in this ratio.

The precise structure of the decaborane/pyridine reaction products is not known, but they conform to the formula $B_{10}H_{12} \cdot 2Py$. They are solids at ordinary temperatures, and are soluble in polar solvents, e.g., alcohols and ethers. They are insoluble in nonpolar solvents, such as benzene, 2,2-dimethylbutane and heptane. The aqueous solutions of these substances form strong reducing solutions.

The invention is illustrated by the following examples.

Example I

About 100 ml. of neohexane, dried over lithium aluminum hydride, was condensed in a 125-ml. flask containing 2.70 g. (0.022 mole) of decaborane. The resulting solution was then introduced into another connecting flask containing 3.49 g. (0.044 mole) of pyridine distilled from barium oxide and dried over calcium hydride. An orange solid was formed accompanied by evolution of hydrogen. The reaction mixture was stirred for 24 hours at room temperature (about 25° C.). It was filtered and dried in vacuo at room temperature for 2 hours. The reaction vessel was filled with nitrogen and opened in a dry box and the solid was transferred out. The crude product was then dissolved in tetrahydrofuran forming a dark red solution. Light yellow crystals of $$B_{10}H_{12} \cdot 2C_5H_5N$$

were formed when this solution was concentrated. The crystals were dried by heating the substance to 90° C. and removing the solvent in vacuo. The yield based on hydrogen gas collected was 36%.

*Analysis.*—Calc'd for $B_{10}H_{12} \cdot 2C_5H_5N$: B, 38.85%; C, 43.13%; H, 7.96%; N, 10.06%. Found: B, 36.70%; C, 44.53%; H, 8.19%; N, 9.54%.

Example II

About 10 ml. of pyridine (0.124 mole) distilled from potassium hydroxide, was condensed in a 125-ml. flask attached to a vacuum train containing 5.02 g. (0.041 mole) of decaborane. The reaction mixture was brought to room temperature and stirred for 24 hours at room temperature. A red solid was formed with evolution of hydrogen. Neohexane was then condensed into the reaction flask in order to dissolve the unreacted decaborane. The reaction mixture was filtered and the solid product was dissolved in tetrahydrofuran and crystallized from it. Yellow crystals of $B_{10}H_{12} \cdot 2C_5H_5N$ were obtained. The yield based on the hydrogen obtained was 15%.

*Analysis.*—Calc'd for $B_{10}H_{12} \cdot 2C_5H_5N$: B, 38.85%; C, 43.13%; H, 7.96%; N, 10.06%. Found: B, 37.86%; C, 43.91%; H, 7.84%; N, 9.70%.

Example III

Decaborane (2.13 g., 0.0174 mole) and 2,4,6-trimethylpyridine (25 ml.) were placed in a 100-ml. stainless steel reactor cooled with acetone-solid carbon dioxide and evacuated to less than 0.0001 mm. Hg. The reactor was heated for 10 hours at 100° C. The hydrogen collected amounted to 0.0223 mole (128% of theory). The reactor was opened and a yellow solid believed to be $B_{10}H_{12} \cdot 2[(CH_3)_3C_5H_2N]$ was obtained. The product was soluble in ethers and partially soluble in water; it was insoluble in hydrocarbons.

Examples of additional alkyl-substituted pyridines that can be used in making the decaborane/pyridine reaction product of this invention are the picolines, i.e. 2-methylpyridine, 3-methylpyridine and 4-methylpyridine; 4-ethylpyridine; the lutidines, i.e., 2,4-dimethylpyridine and 2,6-dimethylpyridine; the collidines or trimethylpyridines such as 2,4,5- and 2,3,6-trimethylpyridines; 4-t-butylpyridines; 2-n-amylpyridine; 3,5-diisopropylpyridine; 2,6-dimethyl-4-n-propylpyridine; 2-tertiary-butyl-6-methylpyridine; 2-methyl-3,5-diisopropylpyridine; 2,6-dimethyl-4-n-tridecylpyridine; and 2,6-dimethyl-4-pentadecylpyridine.

As indicated in Example II, decaborane and the pyridine can be reacted in the presence of excess pyridine or alkyl-substituted pyridine which acts as solvent. Generally, however, it is preferred to employ another solvent. Suitable solvents are hydrocarbons such as, for instance, benzene, heptane and neohexane; ethers, such as diethyl ether and tetrahydrofuran; and ketones, such as acetone and cyclohexanone.

The decaborane/pyridine reaction products have reducing properties. Thus, aqueous solutions of these products reduce silver nitrate to metallic silver and nickel chloride to metallic nickel. The products are also useful as curing agents for rubber. This is illustrated in the following example.

Example A

Pale crepe natural rubber (20 g.) was masticated at 100° C. It was cooled to room temperature and 0.2 g. of bis(2-hydroxy-3-tertiary-butyl-5-methylphenyl)methane as an antioxidant and 0.2 g. of $$B_{10}H_{12} \cdot 2C_5H_5N$$

as a curing agent were added and milled for 15 minutes at room temperature. The mixture was placed in a mold and heated to 140° C. for 60 minutes at 6000 lb./sq. in. pressure.

The $B_{10}H_{12} \cdot 2C_5H_5N$ effected vulcanization of natural rubber under the above conditions, as evidenced by comparison with a control sample.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Compounds having the formula $B_{10}H_{12} \cdot 2Py$, wherein Py is a member of the group consisting of pyridine and pyridines substituted only with up to three discrete alkyl groups no more than one of which has more than 5 carbon atoms and none of which has more than 15 carbon atoms.

2. The compound represented by the formula $$B_{10}H_{12} \cdot 2C_5H_5N$$

3. Decaborane/picoline adducts having the formula $$B_{10}H_{12} \cdot 2[(CH_3)C_5H_4N]$$

4. Decaborane/lutidine adducts having the formula $$B_{10}H_{12} \cdot 2[(CH_3)_2C_5H_3N]$$

5. Decaborane/collidine adducts having the formula $$B_{10}H_{12} \cdot 2[(CH_3)_3C_5H_2N]$$

6. Decaborane/2,4,6-trimethylpyridine adduct.

7. Process for preparing a compound of claim 1 which comprises adding a nitrogen-containing compound of the group consisting of pyridine and pyridines substituted only with up to three discrete alkyl groups no more than one of which has more than 5 carbon atoms and none of which has more than 15 carbon atoms to decaborane in a solvent, whereupon hydrogen is liberated in an amount substantially equal on a mole basis to the quantity of decaborane employed.

8. Process of claim 7 wherein the mole ratio of nitrogen-containing compound to decaborane is at least 2:1.

9. Process of claim 7 wherein the mole ratio of nitrogen-containing compound to decaborane is greater than 2:1, the excess of nitrogen-containing compound over the 2:1 ratio being used as the solvent.

10. Process of claim 7 wherein the solvent is selected from the group consisting of hydrocarbons, ethers and ketones.

References Cited in the file of this patent

Brown et al., J. Am. Chem. Soc., vol. 64, pp. 325–6 (1942).
Taylor et al., J. Am. Chem. Soc., vol. 77, pp. 1506–1507 (1955).
Guter et al., J. Am. Chem. Soc., vol. 78, p. 3546 (1956).